Figure 1:
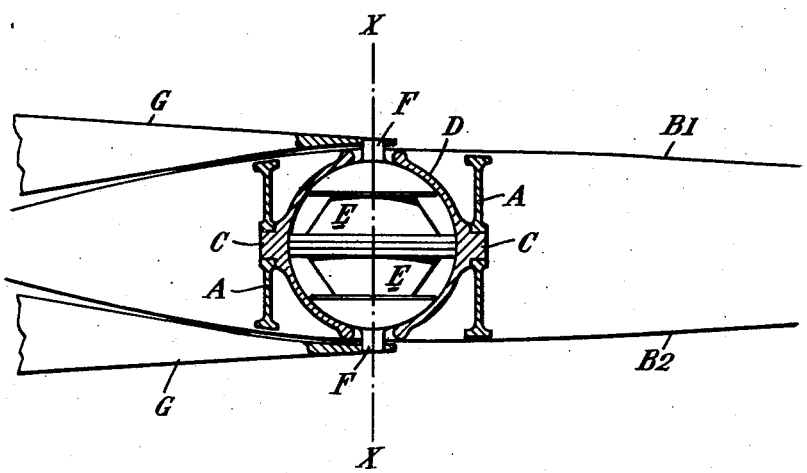

June 27, 1961  B. N. WALLIS  2,990,141
PIVOT CONNECTION FOR VARIABLE SWEEPBACK AIRCRAFT WINGS
Filed April 23, 1956  6 Sheets-Sheet 1

INVENTOR
BARNES NEVILLE WALLIS
By Mason, Koch, Crews & Berry
ATTORNEYS

United States Patent Office 2,990,141
Patented June 27, 1961

2,990,141
PIVOT CONNECTION FOR VARIABLE SWEEP-BACK AIRCRAFT WINGS
Barnes Neville Wallis, Effingham, England, assignor to Vickers-Armstrongs (Aircraft) Limited, London, England
Filed Apr. 23, 1956, Ser. No. 580,130
Claims priority, application Great Britain Apr. 26, 1955
12 Claims. (Cl. 244—46)

This invention is concerned with the provision of an improved form of bearing for use between relatively pivotable objects in circumstances where the load transmitted between them has a major component acting in the direction of the pivotal axis. A further object is the provision, in such a bearing, of means for accommodating a secondary pivotal movement between the pivoted objects about an axis intersecting the principal axis.

An instance of a bearing having these characteristics is found in an aeroplane of which the wings are pivotable in sweep, where the pivot axes are approximately parallel to the OZ axis of the aircraft, in which the major components of the loading forces transmitted between the wings and the body (due to the lift of the wings in flight and to the weight of the wings when the aircraft is on the ground) act in the direction of the pivot axes, and wherein variations in bending and torsional loads upon the wings are reflected by a change in the slope of the wing spars at the pivots.

In a bearing according to the invention, the relatively pivotable objects are respectively connected to a housing, and to a piston enclosed in said housing with capability of a limited stroke therein, said piston being operatively associated with a bearing member which, when the pivot is at rest, is constrained by an axially-directed load on the piston to occupy a mating juxtaposition with a conformably shaped bearing member of the housing, and means are provided for supplying fluid under pressure to said housing the arrangement being such that when the fluid pressure thereby developed in the housing reaches a value at which it can sustain the piston and the load supported thereby, the resultant floating condition of the piston causes said bearing members to separate to form a constricted passage through which the pressurised fluid may flow and thereby allow the pivot to be operated.

In order to afford the pivoted objects a certain degree of relative pivotal movement about an axis intersecting the principal pivot axis, part of the surface of the housing and piston bearing members are respectively of concave and convex spherical form. Such parts are located in regions which occupy "polar" and "equatorial" positions with respect to the principal pivot axis; and those parts of the housing and piston lying between the spherical surfaces of the "equatorial" region and of the "polar" cap, are shaped so that they combine to form an annular chamber which receives a supply of fluid under pressure.

When the polar bearing surfaces of the housing and piston are in mating juxtaposition the escape of the fluid from this chamber is barred, and on the admission of fluid the pressure will rise until the force acting on the walls of the chamber is sufficient to overcome the external force that is holding the mating surfaces together. A slight axial displacement of the piston relative to the housing then takes place, separating the surfaces, with the result that fluid can escape through the gap so formed between them towards an outlet surrounding the pivot. The pressure required to force the fluid through the gap follows well-known laws connecting the pressure, velocity, mass and viscosity of the fluid with the length and interfacial dimension of the gap. Due, however, to the fact that the passage is convergent towards the principal pivotal axis, the velocity of the fluid steadily rises as it approaches the axis, and the marked drop in pressure experienced in a passage of constant cross-section is prevented, the fluid pressure remaining almost constant at the value developed in the pressure chamber until said outlet is reached.

By these means the load-bearing area of the pivot is increased from that defined by the aforesaid annular pressure-chamber to that defined by the full cross-section of the spherical housing less that of the relatively small outlet which surrounds the pivot. The metallic surfaces of the bearing being separated in this way by the continuous flow of fluid at high pressure, it follows that the external load under which the pivot bearing can safely be rotated depends only on the maximum pressure which can be imparted to the fluid by pumps or other pressurising means, while the frictional resistance to pivotal rotation depends solely on the viscosity of the said fluid and the angular velocity.

The "equatorial" bearing surfaces serve to support an additional load having a major component acting normal thereto.

In the case of a pivot bearing which may be subjected at different times to loads acting in opposite directions, the apparatus may be duplicated, there being two oppositely disposed housing-and-piston units which are alternatively pressurised according to the direction of the loading force.

Figure 2:
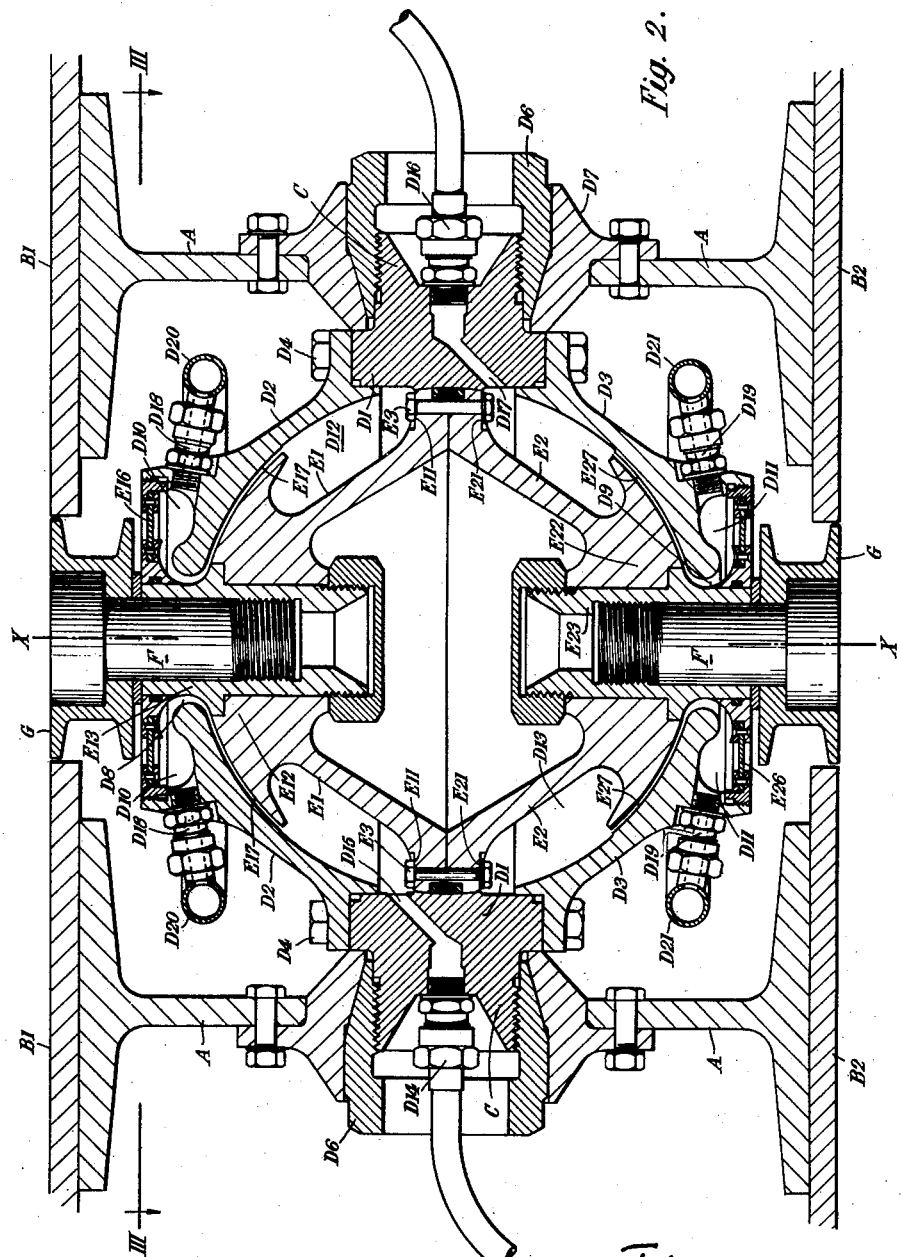
Figure 3:
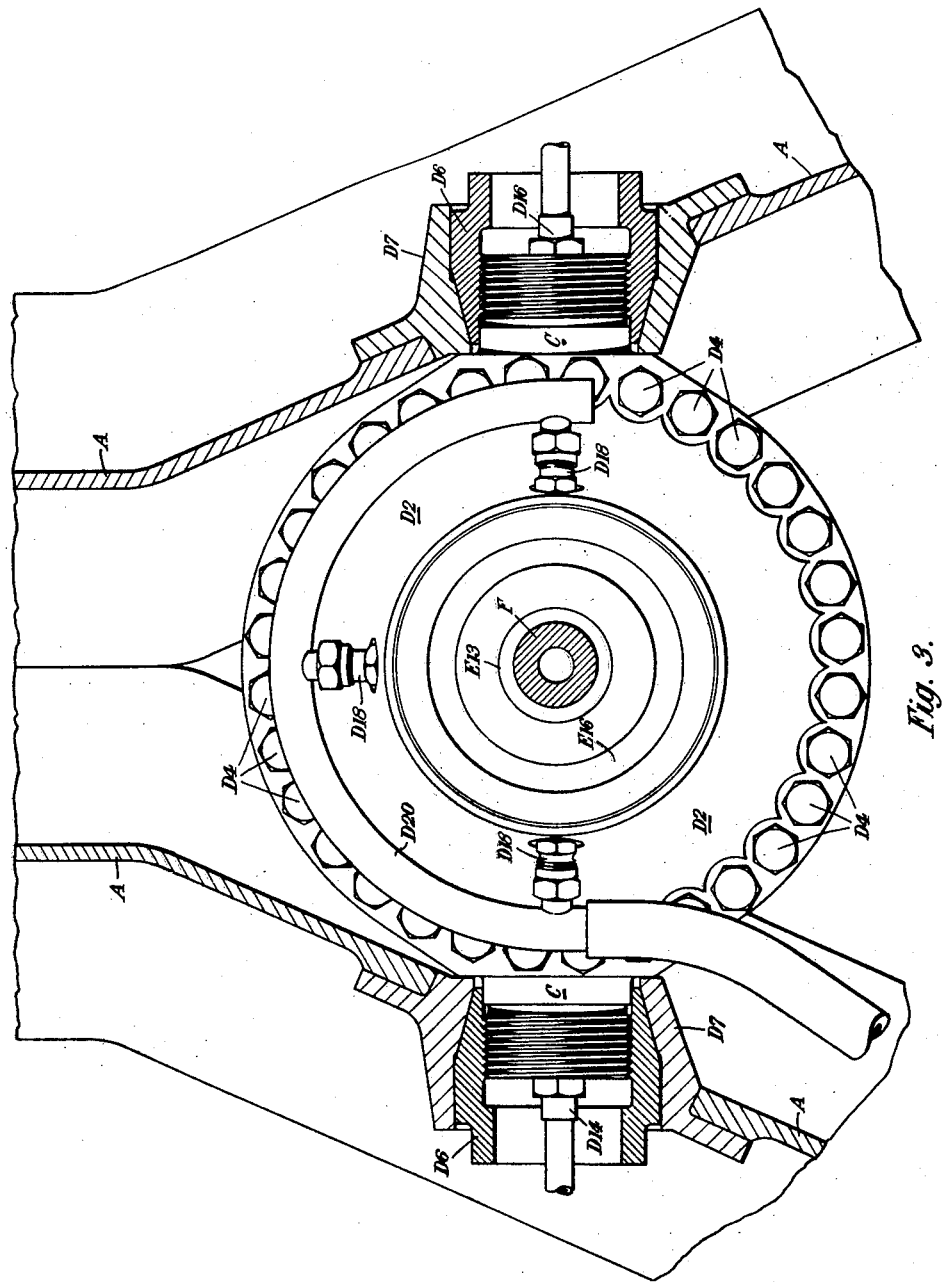

The following particular description of a preferred embodiment of the invention relates to an aeroplane having wings which are adjustable in sweep, the invention being applied to the bearing by which each wing is pivoted to the body, providing an instance of the case in which the loading force may at different times act in opposite directions, since the wings support the body when the aeroplane is in flight, but are supported by the body when the aeroplane is on the ground. Reference is made in such description to the accompanying diagrammatic drawings, of which FIG. 1 is a general sectional view of the pivot between the wing and the body, FIG. 2 is a transverse section on the pivot bearing and spar structure on a larger scale, FIG. 3 is a section taken on the line III—III of FIG. 2, and FIGS. 4 to 6 illustrate three alternative hydraulic systems relating to the pivot bearings of both wings, including the apparatus associated therewith.

In the drawings the letters A, A denote two I-section members which constitute the spar or a rib of the wing, and $B_1$, $B_2$ the upper and lower skins thereof. Supported between said members A, A by trunnions at C, C is a concave spherical housing D which encloses a double-acting piston E which is generally of spherical form and is supported by spigots at F, F in the extremities of two spaced beam-like members G, G of the body structure. The constructional details of the housing D and piston E are illustrated and hereinafter described with reference to FIGS. 2 and 3.

The concave spherical housing D (of FIG. 1) is composed of three parts, viz. the equatorial belt D1 and the two spherical polar caps D2 and D3 which are attached by bolts D4 respectively above and below said belt D1 to complete the spherical form. The housing D is mounted upon the members A, A by means of trunnions C, which project from diametrically opposite points of the belt D1 and are received in nuts D6 carried by brackets D7 which are bolted to said members A, A.

The member E comprises two identical complementary frusto-conical parts E1 and E2, having at their bases peripheral flanges E11 and E21 which are secured together back to back by bolts E3; the outer ends of the parts E1, E2 are formed with spherical polar caps E12 and E22, respectively. The flanges E11, E21 combine to form a disc which constitutes the piston, the rim surface being spherical and adapted to cooperate with the conformably shaped inner wall of the equatorial belt D1 of the housing D. The polar caps E12, E22 are supported by means of bushes E13, E23 upon aligned spigots F, F carried by the upper and lower beams G, G; the holes in the caps D2, D3 of the housing through which the spigot bushes pass are slightly larger in diameter than the bushes themselves and thus provide annular passages at D8, D9 for the purpose hereinafter described. Said bushes E13, E23 are connected to the polar caps D2, D3 of the housing by means of annular seals incorporating diaphragms E16, E26 which are sufficiently elastic to permit a slight degree of relative axial and angular movement between the members D and E. Said diaphragms also serve to enclose annular chambers D10, D11.

The polar axis of the member E is shorter than that of the housing D by an amount which, when the spherical surface of the polar cap mates with the surface of the housing D at one end of the axis X—X (hereinafter referred to as the "principal pivot axis"), will cause the opposite polar regions of the members D and E to separate by a narrow gap at E17 or E27. This condition is contrived in the course of machining the member E, by inserting a shim plate of the requisite thickness between the flanges E11, E21, lapping the polar caps E12, E22 into the housing surfaces and subsequently removing the shim plate.

The trunnions C are used to accommodate pipe connections to a hydraulic control system, whereby a liquid under pressure is admitted to the annular chambers D12, D13 which are respectively enclosed by the housing D above and below the piston E11, E21. The liquid is supplied by a pump or pumps of the displacement type, the delivery pressure depending upon the degree of constriction afforded by the outlet passages, i.e. the gaps E17, E27. The inlet pipe connection for the upper chamber D12 is indicated at D14 and admission to the chamber is gained by a duct D15; the corresponding inlet pipe connection and duct for the lower chamber are indicated at D16 and D17. The outlets for said chambers D12, D13 are provided by the aforementioned gaps E17, E27, which lead through the annular passages D8, D9, the annular chambers D10, D11 and connections D18 into outlet pipes D20, D21.

When the pivot is at rest, the aircraft being on the ground, and the bearing surfaces of the polar members D2, E12 (or D3, E22) are in mutual juxtaposition, so that the gap E17 (or E27) is closed, the escape of fluid from the chamber D12 (or D13) is prevented until the fluid pressure is sufficient to develop a force on the piston E11, E21, which will overcome the external load by which the said bearing surfaces are held together, it being understood that in this condition, the only load on the pivot is that due to the weight of the wings. When the surfaces of the polar bearing members are separated, the liquid escapes between them continuously at high pressure, and the pivot may now be operated safely in the sweep of the wings. As has hereinbefore been explained, the convergent form of the constricted passage for the liquid which is provided by the gap E17 (or E27) has the effect of increasing the velocity of the liquid as it approaches the annular passage D8 (or D9), maintaining the pressure of the liquid almost constant at the value of that in the chamber D12 (or D13) from which it is escaping until it reaches the outlet chamber D10 (or D11). It will be appreciated that in this condition of the bearing, the load-bearing area of the pivot is increased from that defined by the cross-section of the chamber D12 (or D13) to that defined by the full section of the housing D at the equatorial belt less that of the relatively small outlet passage D8 (or D9) including the spigot F and bush E13 (or E23).

When the aeroplane is in normal horizontal flight and the body is supported by the wing, the loading force is transmitted between the mating surfaces of the lower cap E22 of the member E and the lower cap D3 of the housing D. Let it be assumed that it is desired to adjust the wings in sweep. In these conditions the pressure in the upper chamber D12 will be lower than in the lower chamber D13 (and the gap E17 will be wider than the gap E27) by an amount proportional to the upward force by which the lift on the wing exceeds the downward force due to the weight of the wing. In the event of an applied load, e.g. due to the aeroplane encountering an upward gust, the gap E27 will diminish and the pressure in the lower chamber D13 will immediately rise. At the same time the gap E17 opens, releasing the pressure in the upper chamber D12. The piston E11, E21 is now supported in a floating condition (as illustrated in FIG. 2) in which the wing movements may be freely executed, the force exerted on the underside of the piston again balancing the downward loading force on the lower bearing between the parts E22 and D3.

The pressure in the chambers D12, D13 is governed by the length and interfacial dimension of the gaps E17, E27; the latter dimension may be reduced by the insertion between the flanges E11, E21 of a shim plate thinner than that used in the original machining operation.

The spherical rims of the flanges E11, E21 of the member E cooperate with the equatorial belt D1 of the housing D to form a drag bearing which sustains loads normal to the axis X—X which are due to the aerodynamical drag imposed upon the wing in flight. The spherical form of the bearing surfaces of the members D and E in the polar and equatorial regions permits a sufficient degree of pivotal movement between said members about an axis intersecting the polar axis X—X, e.g. in response to variations in flexural or torsional loads on the wing, such movement being tolerated by the elastic nature of the diaphragms E16, E26. It will be appreciated that the method of machining the parts of the member E, as hereinbefore described, provides the very slight degree of clearance between the spherical faces of the piston E11, E21 and the equatorial belt D1 of the housing necessary to permit a small relative axial movement between the members D and E under the differential pressure in the chambers D12, D13 in working conditions.

Figure 4:
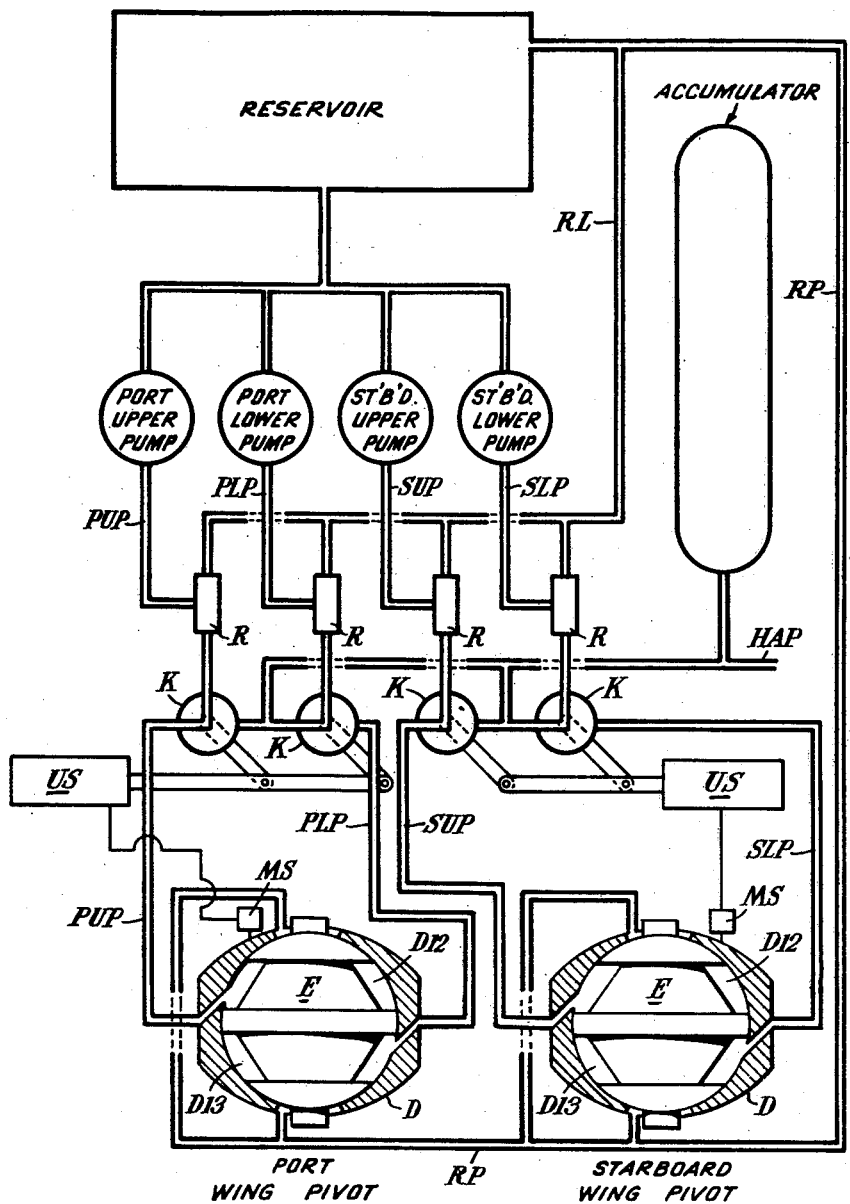
Figure 5:
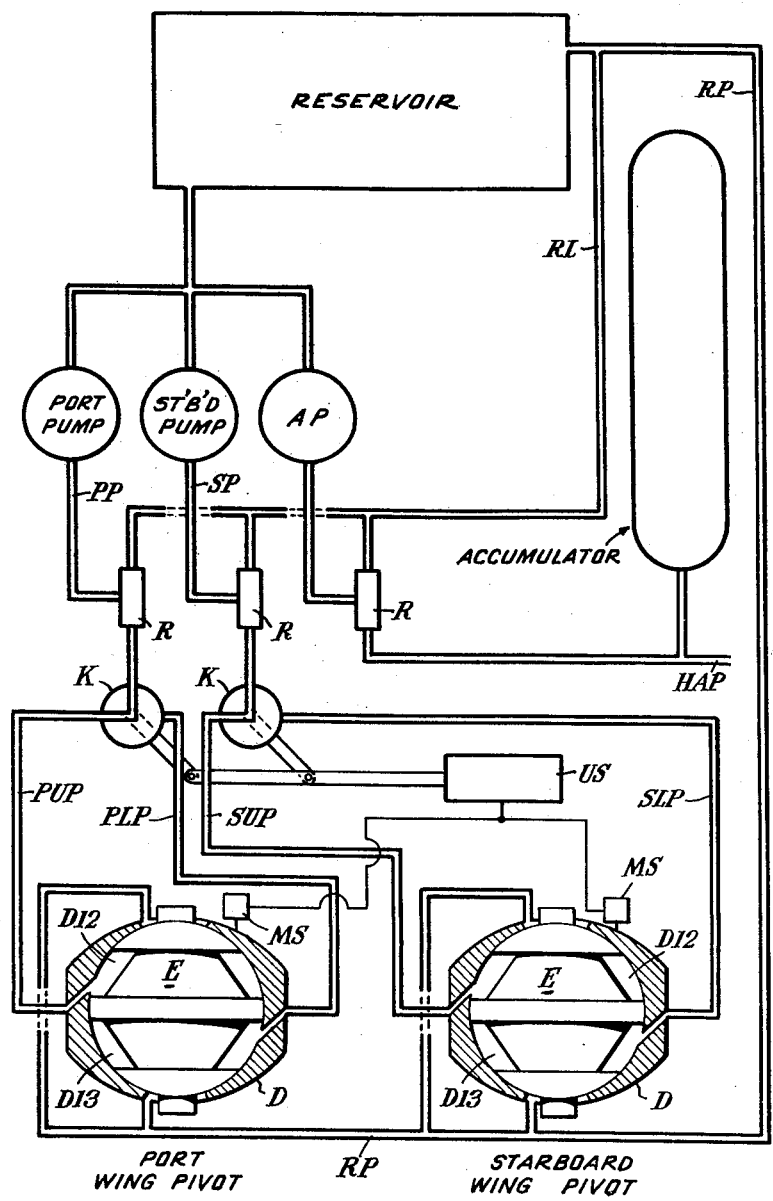
Figure 6:
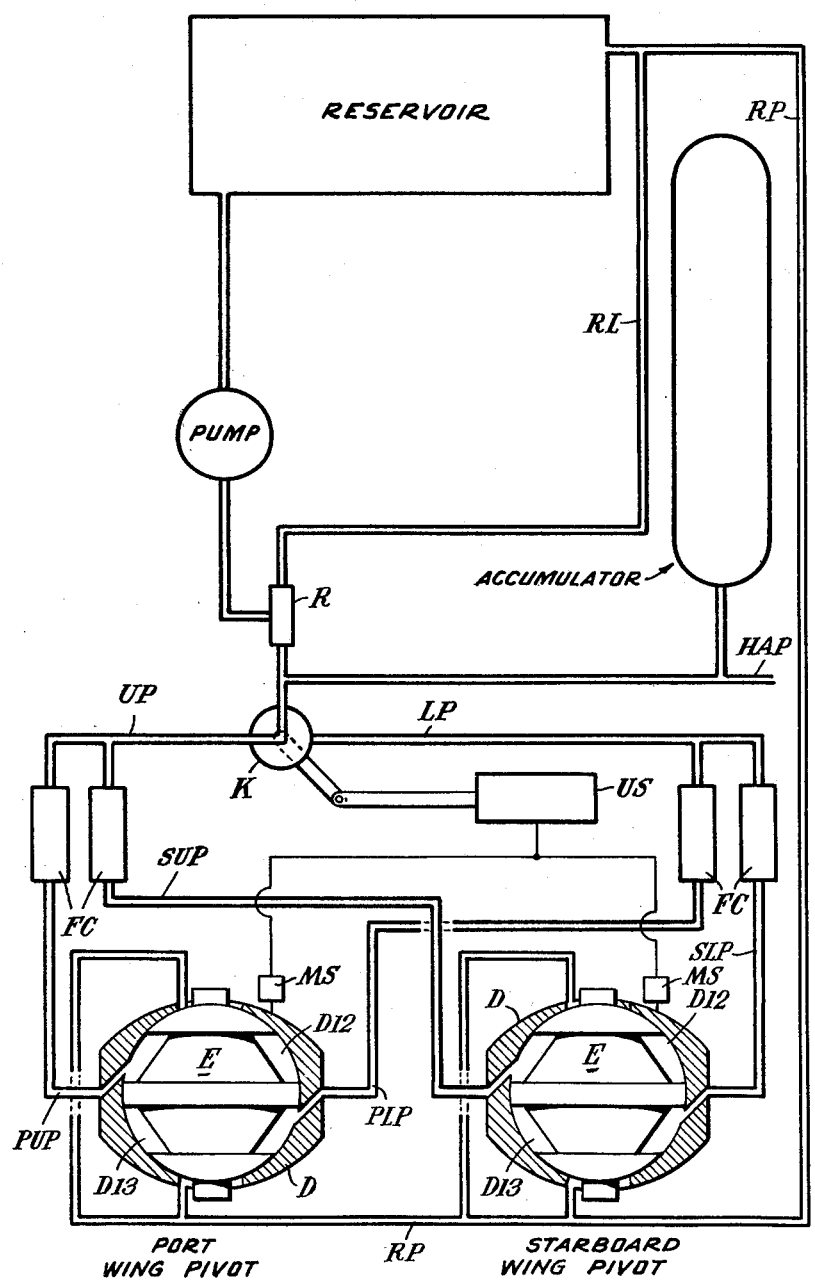

Three alternative arrangements of the hydraulic operating system for the pivot-bearings of the two wings of an aeroplane are shown in FIGS. 4 to 6. In the preferred arrangement shown in FIG. 4, each chamber of each pivot bearing is served by a separate pump drawing working liquid from a common reservoir. Thus, the upper chamber D12 of the port wing pivot is connected by the pipe-line PUP with the "port upper" pump, the lower chamber D13 of the same pivot is connected by the pipe-line PLP with the "port-lower" pump, the upper chamber D12 of the starboard wing pivot is connected by the pipe-line SUP with the "starboard upper" pump, and the lower chamber D13 of said latter pivot is connected by the pipe-line SLP with the "starboard lower" pump. A two-way cock K is inserted in each of said pipe-lines and the pair of cocks relating to each pivot are coupled as shown in such manner that when the cocks relating to the pipe-lines PUP and SUP are open, those relating to the pipe-lines PLP and SLP are turned to divert the output of the "port and starboard lower" pumps to an accumulator by which other hydraulic apparatus on the aircraft may be supplied through the connection HAP. Conversely, when the pipe-lines PLP and SLP are open to admit pressure to the lower chambers of the bearings, the cocks relating to the pipe-lines PUP, SUP are turned to divert the "port and starboard upper" pump outputs to the accumulator.

In a convenient arrangement the pairs of cocks K are adapted to be selectively operated by suitable mechanical or electrical switch-gear or the like (indicated at US, US), which may be actuated through the medium of a microswitch MS or equivalent means responsive to changes in dimensions of the gap E17 (or E27), to select the appropriate pair of pivot chambers to be pressurised, according to whether the wings are supporting or being supported by the body. That is to say, when the aircraft is on the ground, or in inverted flight the upper pivot bearings are in use, the "port and starboard upper" pump outputs being directed through the pipe-lines PUP, SUP to the upper pivot chambers D12, whilst the corresponding "lower" pumps are switched to charge the accumulator. In normal flight, the switch-gear US operates to reverse the cocks K and so to bring the lower pivot bearings into use, the "lower" pumps being switched from the accumulator through the pipe-lines PLP, SLP to the lower pivot chambers D13, the outputs of the corresponding "upper" pumps being diverted to the accumulator. The outlet pipes D20, D21 of the several pivot chambers are connected as shown to a return pipe RP, by which the low pressure liquid leaving said chambers is returned to the reservoir. A relief valve R is included in each of the aforesaid inlet pipe-lines, whereby any excess output of the pumps may be returned through a relief line RL to the reservoir.

The system shown in FIG. 5 incorporates three pumps, one for each of the two pivots and a third, indicated at AP, which is reserved for charging the accumulator. The outputs of the port and starboard pivot pumps are fed, respectively through the pipes PP, SP, to the cocks K by which the upper chamber pipe-lines PUP, SUP, or the lower chamber pipe-lines PLP, SLP, are selected by the switch-gear US. The pumps are automatically switched from the upper pivot bearings to the lower bearings, or vice versa, in accordance with variations of load as already described.

In the system illustrated in FIG. 6, both upper and lower chambers D12, D13 of both port and starboard pivot bearings are served by a single pump. The pump output line, which includes the relief valve R, is coupled both to the accumulator and to the cock K, which latter is operated by the switch-gear US to select either the branch UP serving the two upper chamber pipe-lines PUP, SUP, or the branch LP serving the two lower chamber pipe-lines PLP, SLP. In this case it is necessary to provide in each subsidiary pipe-line an auto-adjustable flow constriction or obturator, indicated at FC, to preserve a constant pressure in the selected pivot chambers.

What I claim as my invention and desire to secure by Letters Patent is:

1. A bearing adapted to be connected to relatively pivotal objects, and including a housing connectable to one of said objects and a piston connectable to the other of said objects, said piston being enclosed in said housing with capability of a limited stroke therein, said piston and housing having respectively connected thereto bearing members which possess load-transmitting surfaces which are conformably shaped one to the other, the load transmitting surfaces of the housing and piston bearing members being respectively of concave and convex spherical form, such that the housing and the piston may partake of relative pivotal movement about an axis intersecting the principal pivot axis, the bearing members connected to said piston being distinct therefrom and constrained by an axially-directed load on the piston to occupy a mating juxtaposition with the conformably shaped bearing members connected to the housing when said bearing is at rest, and means for supplying fluid under pressure to said housing so that when the fluid pressure thereby developed in the housing reaches a value at which it can sustain the piston and the load supported thereby, the resultant floating condition of the piston causes said bearing members to separate to form a constricted passage through which the pressurized fluid may flow and thereby allow the bearing to be operated, and means providing communication between the housing and an external region of reduced pressure.

2. A bearing as claimed in claim 1 wherein additional bearing members complemental to each other are incorporated respectively in the housing and the piston to support loads having a major component normal to the principal pivot axis.

3. Bearing as claimed in claim 1 wherein said housing and said piston comprise two like integral units relatively oppositely disposed for supporting axial loads acting in opposite directions at different times, and means being provided for pressurising said units alternatively according to the direction of the loading force.

4. In an aeroplane having wings pivotable in sweep, a wing pivot including a bearing as claimed in claim 3, wherein the pressurising means to the respective units includes means selectively operable in accordance with the direction of the loading force.

5. In an aeroplane having wings pivotable in sweep, a wing pivot bearing as claimed in claim 4, wherein switch gear means responsive to changes in the direction of the loading force on the pivot are provided for selectively operating the fluid supply means.

6. A bearing as claimed in claim 1 wherein the housing is a concave sphere comprising an equatorial belt and two sperical polar caps seecured respectively on opposite sides of said belt, trunnions projecting from diametrically opposite sides of said belt being provided for supporting said sphere upon one of the objects connected by the bearing.

7. A bearing as claimed in claim 6, said piston comprising two complementary parts secured together back to back to form a disc-like portion having a spherical rim surface cooperating with the conformably shaped inner surface of the equatorial belt of the housing, the piston having axial extensions which constitute said piston bearing members of less diameter than the piston, the axial dimension of the convex sphere so constituted being less than that of the concave spherical housing, and means for supporting said polar caps upon spaced parts of the other of the objects connected by the bearing.

8. A bearing as claimed in claim 7, including means for supplying a pressurised fluid through the housing trunnions to the chambers enclosed respectively above and below the piston, and means permitting discharge of the fluid from said chambers.

9. A bearing as claimed in claim 8, wherein constricted convergent passages for the fluid escaping from said chambers are contrived between the spherical surfaces of the housing and piston bearing members leading to outlets about the pivot axis.

10. A bearing as claimed in claim 8 wherein spigots are provided to support the piston bearing members, said spigots projecting inwardly through axially disposed holes in the housing from the pivoted object which carries the piston, said holes being of larger diameter than the spigots, and means connecting the housing to said spigots to enclose annular chambers serving to receive liquid flowing outwardly past the bearing members and the spigots and to conduct it to discharge.

11. The combination of a bearing as claimed in claim 10, with a hydraulic system including a pump, a pipe-line connecting the output side of said pump with each housing inlet, and means for regulating pressure in such pipe-lines in accordance with the direction of the load on the bearing.

12. The combination as claimed in claim 10 wherein separate pumps are provided for individually pressurizing the chambers of the housing, and wherein pipe-lines (are provided for connecting said pumps with their respective housing chambers, and wherein selective control means are provided to automatically open one pipe-line and to close the other, and vice versa, in accordance with the direction of the load on the bearing.

(References on following page)

References Cited in the file of this patent

UNITED STATES PATENTS

| | | |
|---|---|---|
| 2,459,826 | Martellotti | Jan. 25, 1949 |
| 2,511,265 | Hoopingarner | June 13, 1950 |
| 2,605,147 | Raichle et al. | July 29, 1952 |
| 2,617,695 | Tauscher et al. | Nov. 11, 1952 |
| 2,692,803 | Gerard | Oct. 26, 1954 |
| 2,695,199 | Blizard | Nov. 23, 1954 |
| 2,722,463 | Shaw et al. | Nov. 1, 1955 |
| 2,822,223 | Offen | Feb. 4, 1958 |